J. SHIFLET.
SIGNAL.
APPLICATION FILED NOV. 11, 1916.

1,230,810.

Patented June 19, 1917.
2 SHEETS—SHEET 1.

Witnesses

Inventor
Joseph Shiflet
By Victor J. Evans
Attorney

J. SHIFLET.
SIGNAL.
APPLICATION FILED NOV. 11, 1916.
1,230,810.
Patented June 19, 1917.
2 SHEETS—SHEET 2.
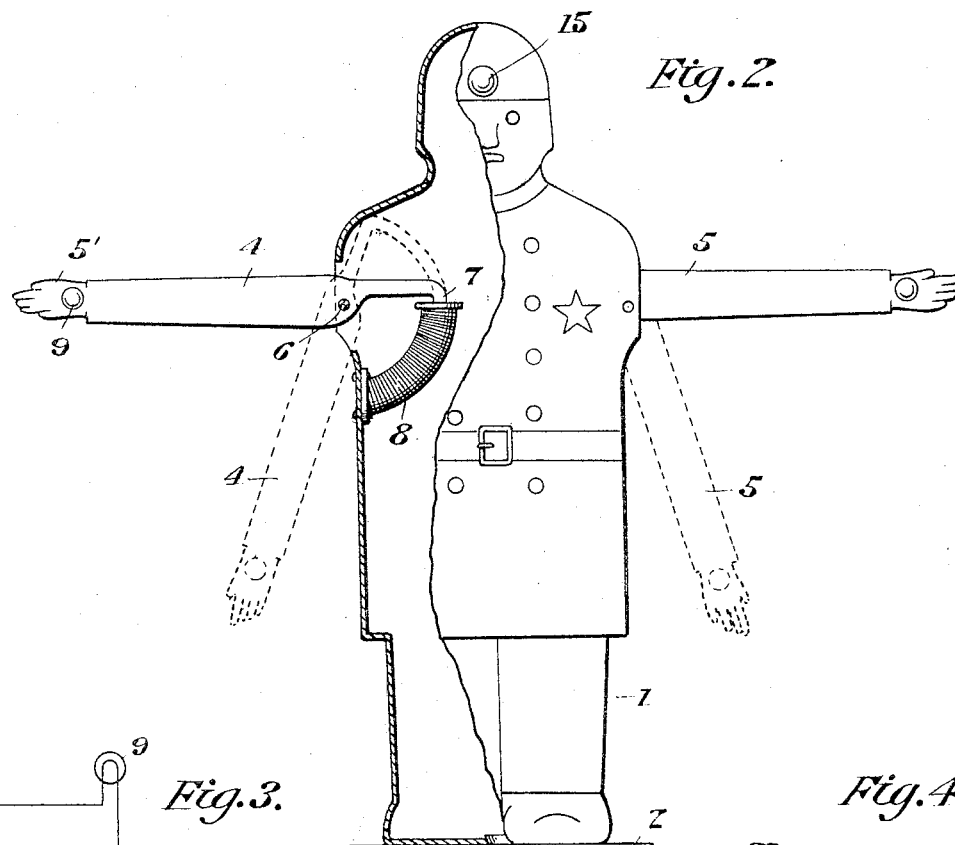
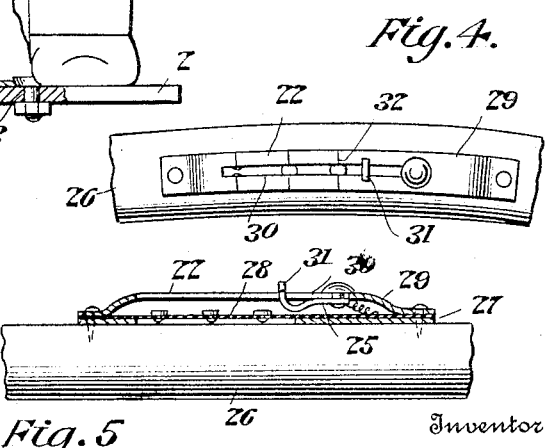
Witnesses
M. D. Shifer
Inventor
Joseph Shiflet
By Victor J. Evans
Attorney

UNITED STATES PATENT OFFICE.

JOSEPH SHIFLET, OF McKEESPORT, PENNSYLVANIA.

SIGNAL.

1,230,810.  Specification of Letters Patent.  Patented June 19, 1917.

Application filed November 11, 1916. Serial No. 130,819.

*To all whom it may concern:*

Be it known that I, JOSEPH SHIFLET, a citizen of the United States, residing at McKeesport, in the county of Allegheny and State of Pennsylvania, have invented new and useful Improvements in Signals, of which the following is a specification.

This invention relates to a signaling apparatus capable of being mounted upon an automobile for giving visible indications to an automobile in the rear as to the direction the first automobile is to take, and has for its primary object to accomplish this in a simplified manner without sacrificing the efficiency of a device of this character.

An object of the invention is to construct the apparatus in the form of a novelty so as to attract attention, but capable of indicating "right," "left" and "stop."

Besides the above my invention is distinguished in the manner of constructing the arm and armature of a single piece of material so that the same may be stamped at one operation of a stamping machine and quickly associated with the figure and solenoid thus materially reducing the cost of manufacture thereof. A very important feature of my invention is the novel manner of energizing the signal lamp when the arm is in display position.

With these and other objects in view the invention will be better understood from the following detail description taken in connection with the accompanying drawings wherein:—

Fig. 2 is a front elevation partly in section of the device.

Fig. 3 is a detail sectional view through the solenoid.

Figs. 4 and 5 are views of the switch.

Figure 1:
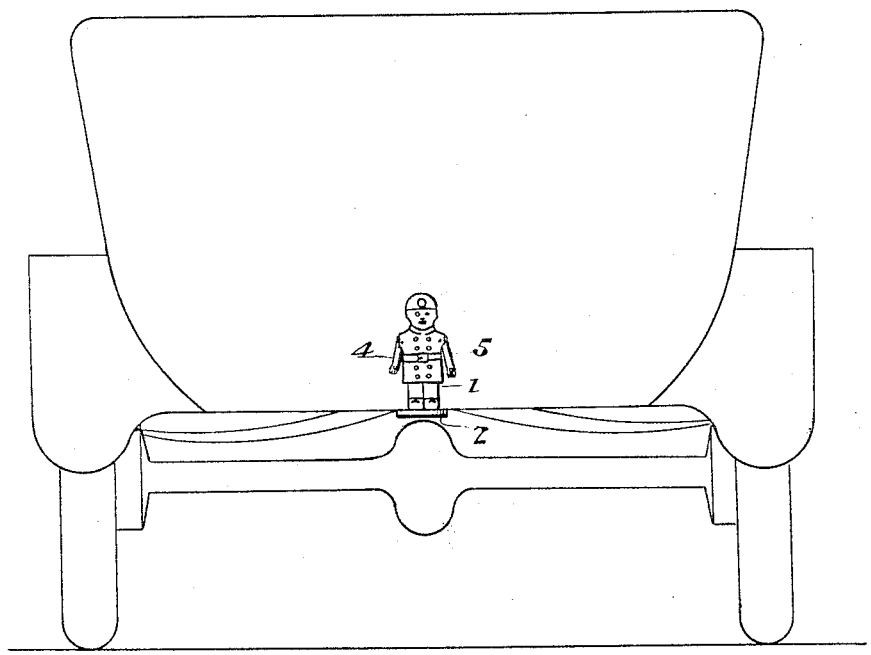
Figure 1 is a rear elevation of an automobile showing my invention applied thereto.

At the beginning I wish to call attention to the fact that although I show the apparatus mounted upon an automobile the same may be used for various other purposes such as displaying advertisements or giving signals at railway and street crossings.

Referring to the drawings the numeral 1 designates a hollow figure of a person mounted upon the bracket 2 by the bolt 3 and this bracket 2 is in turn secured to the body of an automobile. The arms 4 and 5 of the figure are pivotally connected to the body as indicated at 6 so as to swing in a vertical direction. One end of each arm is formed into a hand 5 and the other end is shaped into an arcuate armature 7.

At this point I wish to call attention to the fact that the arm and armature are stamped at one operation of a stamping machine so as to reduce the cost thereof and to also reduce the time necessary to associate the arm, armature and solenoid 8 together.

Figure 6:
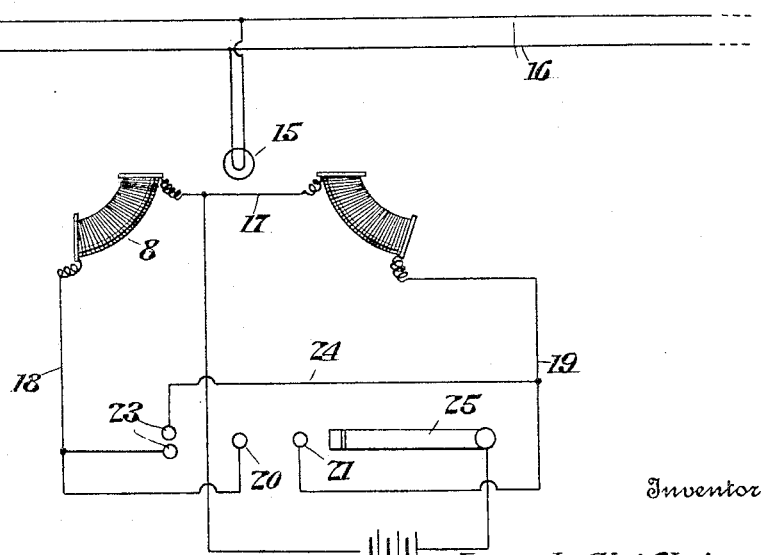
Fig. 6 is a diagrammatic view of the wiring.

As the construction of each arm and solenoid is identical I will limit the following description to the solenoid using with the arm 4. This solenoid as clearly shown in Fig. 6 is arcuate shaped and one end is flanged and provided with openings for the reception of securing elements by which the solenoid is mounted within the figure. The hand has arranged therein an electric bulb 9 to be used at night and the circuit 10 thereof includes a switch 11 whereby the bulb may be thrown in circuit with the illuminating system of the automobile. One terminal of this circuit is connected to the pivot 6 while the other terminal is secured to a contact 12 that closes one end of the bore 13 of the solenoid.

The contact 12 may be arranged to come directly into engagement with the end of the armature 7 when the arm is in horizontal position but for the purpose of insuring a better electrical connection between the contact and armature I arrange in the bore 13 a coil spring 14 between the contact and armature. When the armature is thrown into engagement with the spring, due to energization of the solenoid the spring besides being compressed will be given a slight turning action which will cause the engaging surfaces of the contact 12, armature 13 and spring 14 to be bright at all times so as to insure a good electrical connection.

For the purpose of illuminating the body of the device I provide a bulb 15 mounted in the head of the figure and shunted across the tail light circuit 16.

The solenoids of the arms have two of their terminals connected together by the conductor 17 while the remaining terminals are connected respectively by conductors 18 and 19 to contacts 20 and 21 of a switch 22. This switch is provided with an extra pair of contacts 23 arranged in the conductor 24, bridged across the conductors 18 and 19.

From this arrangement it will be seen that when the slide 25 of the switch 22 is given movement the solenoids may be independently energized or simultaneously. When both solenoids are energized both arms will be simultaneously thrown up which indicates "stop". In this particular instance the switch 22 is mounted upon the steering wheel 26 and as shown consists of a base plate 27 supporting the strip of insulation 28 that in turn supports the contacts. A cover 29 is secured to the plate 27 and is provided with a slot 30 through which projects an indicator 31 on the slide that cooperates with the indicating lines 32 formed upon the cover by means of which indication will be given as to the position of the arms of the figure.

It is to be understood that the structural embodiment of the invention as a whole and its various features as shown is merely illustrative and not restrictive as I am well aware that many of the details of construction can be widely varied without departing from the spirit of the invention. I therefore do not desire to be limited in these particulars or any others except as set forth in the appended claims.

What I claim is:—

1. In a signaling apparatus of the class described, a pivoted arm of magnetic material having one end formed into an armature, an electric lamp supported by the arm, a solenoid associated with said armature and a switch arranged to be closed upon a predetermined travel of the armature for closing the circuit of said lamp, said switch consisting of a contact supported within the solenoid in the path of movement of said armature.

2. In a signaling apparatus of the class described, a pivoted arm of magnetic material having one end formed into an armature, an electric lamp supported by the arm, a solenoid associated with said armature and a switch arranged to be closed upon a predetermined travel of the armature for closing the circuit of said lamp, said switch consisting of a contact supported by the solenoid and a coil spring continuously bearing upon the contact and arranged in the path of movement of said armature.

In testimony whereof I affix my signature.

JOSEPH SHIFLET.